United States Patent [19]

McLean et al.

[11] 3,803,599
[45] Apr. 9, 1974

[54] MOTION DETECTION SYSTEM
[75] Inventors: Michael B. McLean, Whitefish Bay; Allen Rasmussen, Milwaukee, both of Wis.
[73] Assignee: Johnson Service Company, Milwaukee, Wis.
[22] Filed: Jan. 26, 1972
[21] Appl. No.: 220,943

[52] U.S. Cl.................... 343/5 PD, 307/233, 343/8
[51] Int. Cl.............................................. G01s 9/44
[58] Field of Search....... 343/5 PD, 8; 307/233, 234

[56] References Cited
UNITED STATES PATENTS

| | | | |
|---|---|---|---|
| 3,242,486 | 3/1966 | Corbell | 343/5 PD |
| 3,706,961 | 12/1972 | Sugiura | 343/5 PD |
| 3,581,217 | 5/1971 | Isaacs | 307/233 X |
| 3,512,155 | 5/1970 | Bloice | 343/5 PD |
| 3,184,606 | 5/1965 | Ovenden et al | 307/233 |

Primary Examiner—Maynard R. Wilbur
Assistant Examiner—Gregory E. Montone
Attorney, Agent, or Firm—Johnson, Dienner, Emrich, Verbeck and Wagner

[57] ABSTRACT

An intrusion alarm system for providing an alarm indication in response to the detection of an intruder within a protected area includes Doppler radar apparatus having a transmitter for radiating energy into the protected area, a receiver for receiving Doppler signals provided whenever radiated energy is reflected off a moving body within the protected area and a signal detecting and filter circuit having a lever detector circuit and a low pass digital filter circuit responsive to Doppler signals in excess of a predetermined amplitude and frequency to provide a logic level output indicative of the detection of an intruder within the protected area. In addition to the low pass digital filter circuit, there are described a high pass digital filter circuit and a digital band pass filter circuit.

14 Claims, 14 Drawing Figures

MOTION DETECTION SYSTEM

BACKGROUND OF THE INVENTION

1. Field of the Invention

This invention relates to motion detection, particularly as applied to intrusion alarm systems, and more specifically to a Doppler radar motion detection system for detecting the frequency and amplitude of Doppler signals resulting from the movement of a body within a protected area.

2. Description of the Prior Art

Intrusion detection systems previously proposed having DOppler radar motion detection apparatus using either electromagnetic or acoustic radiation to produce a Doppler shift have been characterized by a number of shortcomings, the most prevalent of which is the undesired detection of noise.

Some type of noise motion will generally be present in any area which is to be protected by a Doppler radar motion detection system. Noise motion is the unwanted yet uncontrollable movement with the protected area which may be caused, for example, by wall vibrations or by machinery, fans, fluorescent lights, etc., operating within the protected area. Each of these objects has a movable part, and accordingly, when energy of a predetermined frequency is radiated into the protected area, the movements of these objects will cause the generation of DOppler signals. The Doppler signals provided as the result of such uncontrollable movement within the protected area appear as ambient noise in the secured area.

Certain prior art motion detection systems have included threshold detecting means which is responsive to Doppler signals in excess of a predetermined amplitude to enable an alarm generator for indicating an intrusion of a secured area. However, because of the presence of uncontrollable ambient noise, the setting of the level detector and thus the overall sensitivity of the motion detection system had to be reduced to a level whereat ambient noise would not be detected. The alarm threshold had to be set well above the average noise level to avoid false alarms. Even so, short duration, high amplitude pusles could still occur causing false alarms to be generated.

To eliminate such problems, certain other prior art motion detection systems have employed integration of the Doppler signals produced over a period of time before an associated alarm generating circuit is enabled to provide an alarm. Although such techniques desensitize the systems to ambient noise and spurious signals, while maintaining a higher sensitivity for the motion detection systems, such systems can be comprised by a "step and wait" motion by an intruder. If the intruder would take a full or partial step during each integration period, the integrator circuit would not reach a level sufficient to enable the alarm generating circuit.

The time integration of the Doppler signal while for the most part being effective to desensitize the systems to the detection of ambient noises, inherently desensitizes the systems to the detection of an intruder whose presence it is desired to detect. With a time integrating system, an intruder who keeps his movements slow will defeat the system since the integrated level of the Doppler signals will be correspondingly low and will never exceed alarm triggering level for the alarm generating circuit.

SUMMARY OF THE INVENTION

The present invention provides a Doppler radar intrusion alarm system having an improved noise rejection characteristic enabling the system to have a more sensitive alarm threshold setting without the need to employ time integration of Doppler signals.

The system includes a level detecting circuit for detecting the amplitude of Doppler signals provided as a result of noise motion and the movements of an intruder within a protected area and a low pass filter circuit for detecting Doppler signals of frequencies that are less than a preselected cutoff frequency for the low pass filter circuit. Doppler signals provided as a result of human motion include low frequency components regardless of the speed at which the human target is moving. Accordingly, the passband of the low pass filter circuit can be very narrow, having a cutoff frequency, for example, of 5.5 Hz, with an attendant reduction in the effect of noise on the system.

Moreover, since only low frequency components of the Doppler signals are effective to produce an alarm indication, the threshold setting for the level detecting circuit can be higher than in previously proposed systems which rely solely on amplitude detection of the Doppler signals.

In one embodiment, the intrusion alarm system provided by the present invention includes Doppler radar means for producing output signals having Doppler frequencies indicative of a moving body within a protected area. The signals are related in amplitude and frequency to the characteristics of the human target.

The output signals are passed to a level detecting circuit which is responsive to each Doppler signal in excess of a predetermined amplitude to provide an output of a duration that is proportional to the frequency of the received Doppler signal.

The outputs provided by the level detecting circuit are extended to a low pass filter circuit which, in a preferred embodiment, comprises a digital filter provided by the present invention, which is responsive to signals of a duration that is greater than a preselected duration to provide an output signal for enabling an alarm indicating means of the system.

The digital low pass filter circuit includes means for providing a reference signal of the preselected duration and means enabled whenever the duration of the Doppler signal is greater than the duration of the reference signal to provide a logic level output indicative of the detection of human motion within the protected area. The logic level outputs thus provided control the alarm indicating means to provide an alarm indication.

The duration of the reference signal, which represents the cutoff frequency for the digital low pass filter circuit, is adjustable to enable the cutoff frequency of the digital filter circuit to be varied.

It is pointed out that the Doppler signals do not pass through the level detecting and digital filter circuits and appear at the output thereof in an unaltered form. Rather, the digital filter circuit provides a logic level output whenever the frequency of a signal supplied to the digital filter circuit is less than the cutoff frequency of the digital filter circuit, and a ground level output whenever the frequency of the signal supplied to the digital filter circuit is equal to or greater than the cutoff frequency. Thus, the digital filter circuit has a substantially infinite roll off characteristic. Moreover, the bandwidth of the digital filter circuit is set at a preselected cutoff frequency and is independent of the level of the signals supplied to digital filter circuit. In addition, the use of a digital filter circuit enables information to be carried in the frequency rather than the shape or amplitude of the waveform input to the filter circuit.

While in one application to an intrusion detection system the digital filter circuit is operable as a low pass filter, with certain modifications, the digital filter circuit can provide a high pass characteristic to thereby provide an output only in response to signals of a frequency that is greater than a preselected frequency for the digital filter circuit. Accordingly, the high pass digital filter circuit includes means for providing a reference signal of a preselected duration, representing the cutoff frequency for the high pass filter, and means enabled whenever the duration of a signal supplied to the high pass digital filter circuit is less than the duration of the reference signal.

Moreover, the low pass digital filter circuit provided by the present invention can be connected in tandem with a high pass digital filter circuit of the present invention to provide a digital bandpass or notch filter wherein the pass band of the filter is determined by the cutoff frequencies of the low pass and high pass digital filter circuits. The digital bandpass filter circuit provides a logic level output only when a signal supplied to the bandpass filter circuit is within the passband of the filter circuit as determined by the cutoff frequencies of the low pass and high pass filter circuits which comprise the digital bandpass filter circuit. Thus, the digital bandpass filter is a true notch filter and the pass band of the digital filter can be made as narrow as desired.

Other features of the invention will become apparent from the following detailed description of the invention which makes reference to the accompanying drawings.

DESCRIPTION OF PREFERRED EMBODIMENTS

Figure 1:
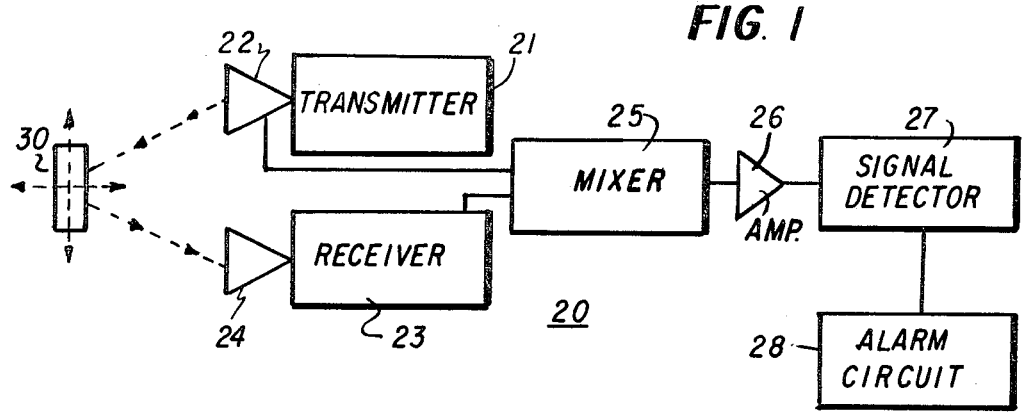
FIG. 1 is a block diagram of a Doppler radar motion detection system provided by the present invention.

A block diagram of a Doppler radar motion detection system 20 provided by the present invention is shown in FIG. 1. The motion detection system 20 comprises Doppler radar apparatus including a transmitter 21 having an associated transmitter antenna 22, and a receiver 23 having an associated receiver antenna 24. In an exemplary embodiment, the transmitter 21 provides microwave signals at a frequency of 2.45 GHz. However, it is apparent that other forms and frequency bands of radiated energy may be used. The 2.45 GHz signals are radiated from the transmitter antenna 22 into an area to be protected and are shown impinging on a moving body or target 30 from which the radiant energy is reflected and picked up by the receiver antenna 24. In accordance with the principles of the Doppler effect, whenever there is moving body within the effective range of the Doppler radar system, that portion of the energy reflected off the moving body has its frequency shifted by the amount of the Doppler frequency. The frequency and the amplitude of the Doppler signal are a function of the size, velocity and reflective characteristics of the moving body.

Digressing, it is well known that the Doppler frequency F is directly related to the frequency of the transmitted energy Fo, the radial velocity Vr of the moving body, relative to the point of reception of the transmitted energy, and the propogation velocity Vp in accordance with the formula:

$$F = 2FoVr/Vp$$

In one application, the motion detection system 20 is used to detect unauthorized movement of an intruder within a protected area. In such application wherein movements of a human target are to be detected, the Doppler frequency F varies over a rather large range. The lowest target velocity Vr is zero when the intruder is stopped, and the highest target velocity Vr one could reasonably expect from a human motion is 33 feet per second (100 yards in 9 seconds) when an intruder is running. Thus, in the motion detection system 20 of the exemplary embodiment wherein the frequency of the radiated energy is 2.45 GHz, the frequency of Doppler signals provided as the result of movements of a human target within the protected area will range from 0 – 167 Hz for the velocity range of 0 to 33 feet per second.

Although the Doppler frequency may range from 0 to 167 Hz in the exemplary system, a person walking at a normal pace will produce signals of approximately 1 Hz to 2 Hz. Moreover, these low frequency components are present regardless of the velocity of the human target. The low frequency components are attributed to the fact that even when running the velocity of the intruder's foot, for example, will decrease to zero as the foot touches the ground and then increase with the next stride. Correspondingly, the frequency of the Doppler signals returned to the receiver 23 will also decrease to zero and then increase. Likewise, when the intruder's arm swing reaches its maximum and begins to return, the frequency of the Doppler signals resulting from reflection of the radiated energy from the arms of the intruder will also decrease to zero and then increase.

Inasmuch as these low frequency component Doppler signals are generally on the order of 1 to 2 Hz, in accordance with one embodiment, the motion detection system has a cutoff frequency of approximately 5.5 Hz. However, if a higher source frequency were used, the system cutoff frequency could be increased correspondingly inasmuch as the range of Doppler frequencies provided would be increased.

When signals at a frequency of 2.45 GHz radiated from the transmitter 21 are reflected off the moving body 30, the resultant Doppler signals are reflected back to the antenna 24 and are coupled to the receiver 23. The output of the receiver 23 is in turn connected to a mixer circuit 25. A portion of the signal energy generated by transmitter 21 is coupled directly into the mixer 25. Thus, the signals obtained in the mixer 25 include the transmitted frequency Fo and the transmitted frequency modulated by the Doppler signals (Fo ± F).

The amplified Doppler signals provided at the output of amplifier 26 are extended to the input of a signal detecting and filter circuit 27 which detects both amplitude and frequency of the received Doppler signals and provides a trigger signal for an alarm generating circuit 28 whenever the amplitude of a received Doppler signal is greater than a predetermined level and the frequency of the received Doppler signal is less than a preselected frequency.

The transmitter 21, the receiver 23, the mixer circuit 25 and the amplifier 26 may comprise a conventional low power Doppler radar system, and accordingly, the circuits for this portion of the system are not described in detail. The alarm circuit 28 may comprise an indicating device, an alarm relay or some other type of alarm indicator as is conventional in the art.

Figure 2:
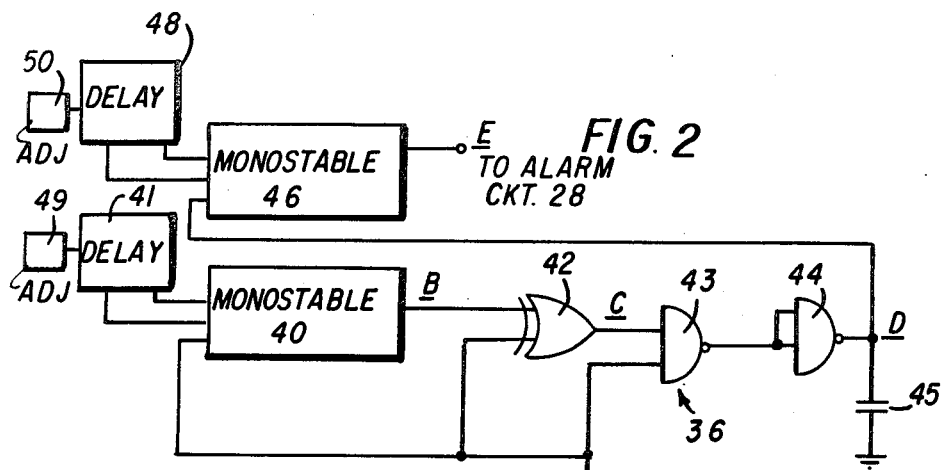
FIG. 2 is a schematic representation of one embodiment for a signal detecting and filter circuit for the system shown in FIG. 1 including a level detector circuit and a low pass digital filter circuit.

One embodiment for a signal detecting and filter circuit 27, shown in detail in FIG. 2, includes a level detecting circuit 35 and a low pass digital filter circuit 36 having a cutoff frequency Fc of 5.5 Hz. As will become apparent, the pass characteristic of the substantially infinite rolloff, and accordingly, the digital filter circuit will be responsive only to signals of frequencies less than 5.5 Hz regardless of the amplitude of the signals.

Referring to FIG. 2, the level detecting circuit 35, which may comprise a Schmitt trigger circuit, is responsive to received Doppler signals in excess of a predetermined amplitude to provide an output for the duration or frequency of the Doppler signal supplied to the input of the Schmitt trigger circuit 35.

The Schmitt trigger circuit 35 includes an input switching transistor Q1, which is normally cut off, and an output switching transistor Q2, which is normally saturated. The collector-emitter circuit of the input transistor Q1 is connected across the base-emitter circuit of the output transistor Q2. As is understood in the art, the Schmitt trigger circuit 35 has a stable state with transistor Q1 normally cut off and transistor Q2 normally saturated. When the amplitude of an input signal supplied to the base of transistor Q1 is in excess of a DC voltage established thereon, the condition of transistors Q1 and Q2 is reversed, and the output transistor Q2 becomes cut off while the input transistor Q1 is saturated. This condition continues until the amplitude of the input signal on the base of input transistor Q1 returns to a value below the original DC bias voltage, whereupon the Schmitt trigger circuit 35 reverts to its original stable state with input transistor Q1 cut off and output transistor Q2 saturated. The DC bias on the base of transistor Q1 is adjustably selected by means of a potentiometer R1. Whenever output transistor Q2 is cut off, the Schmitt trigger circuit 35 provides a logic level output signal +V at output A which is of a duration which is proportional to the frequency of the Doppler signal extended to the input of the Schmitt trigger circuit 35.

The digital low pass filter circuit 36 includes a resettable monostable circuit 40 having an associated delay circuit 41. The delay circuit 41 determines the length of time for which the monostable circuit is enabled and thus, the cut off frequency for the digital filter circuit 36. The delay circuit 41 is adjustable by way of an adjust network 49 to vary the length of enabling time of the monostable circuit 40. In the present example, the delay circuit 41 is set to provide a cutoff frequency of 5.5 Hz for the Doppler signal filter circuit 36 of the motion detection system.

The monostable circuit 40 is set to provide a +V logic level output at B whenever an enabling signal is extended to the set input of the monostable circuit 40 which is connected to output A of the Schmitt trigger circuit 35. The filter circuit 36 further includes an exclusive OR gate 42 having a first input connected to the output B of the monostable circuit 40 and a second input connected to output A of the Schmitt trigger circuit 35. The exclusive OR circuit 42 compares the duration of the +V level output of the Schmitt trigger circuit 35, which represents the frequency of the received Doppler signal F, to the duration of the +V level output provided by the monostable circuit 40, which represents the cutoff frequency Fc for the digital filter circuit 36.

The exclusive OR circuit 42 will be enabled to provide a +V level output whenever a logic level signal +V is present on either input, but not on both inputs. Thus, whenever the duration of the signal output of the Schmitt trigger circuit 35 is greater than the duration of the output of the monostable circuit 40, the exclusive OR circuit 42 will be enabled when the monostable circuit 40 times out. Alternatively, whenever the duration of the signal output of the Schmitt trigger circuit 35 is less than the duration of the signal output of the monostable circuit 40, the exclusive OR circuit 42 will be enabled when the output of the Schmitt trigger circuit 35 goes to zero.

The output of the exclusive OR circuit 42 is extended to an input of a NAND gate 43, a second input of which is connected to the output A of the Schmitt trigger circuit 35. The NAND gate 43 is enabled only when the exclusive OR gate is enabled while a +V level output is being provided by the Schmitt trigger circuit 35. Stated in another way, the NAND gate 43 will be enabled only when the duration of the signal output of the Schmitt trigger circuit 35 is greater than the duration of the output signal provided by the monostable circuit 40 or when the frequency F of Doppler signal extended to the Schmitt trigger circuit 35 is less than the cut-off frequency Fc of the digital filter circuit 36.

The output of NAND gate 43 is extended over a second NAND gate 41, which serves as an inverter to a set input of a second resettable monostable circuit 46. A capacitor 45 connected to ground at the output of NAND gate 44 suppresses transients.

Since the duration for which the NAND gate 43 is enabled is related to the frequency F of the Doppler signal being detected, the second monostable circuit 46 is used to provide a constant duration output for each Doppler signal extended to the filter circuit 36 which is of a frequency that is less than the cutoff frequency Fc of the digital filter circuit 36.

Accordingly, whenever NAND gate 43 is enabled the +V level output provided by NAND gate 43 and inverted by NAND gate 44 will enable the monostable circuit 46 to provide a +V level output at E for a predetermined duration.

The length of time for which the monostable circuit 46 is enabled and thus the duration of the output signal for the digital filter circuit 36 is controlled by the delay circuit 48 the operation of which is adjusted via an adjust network 50.

Figure 2A:
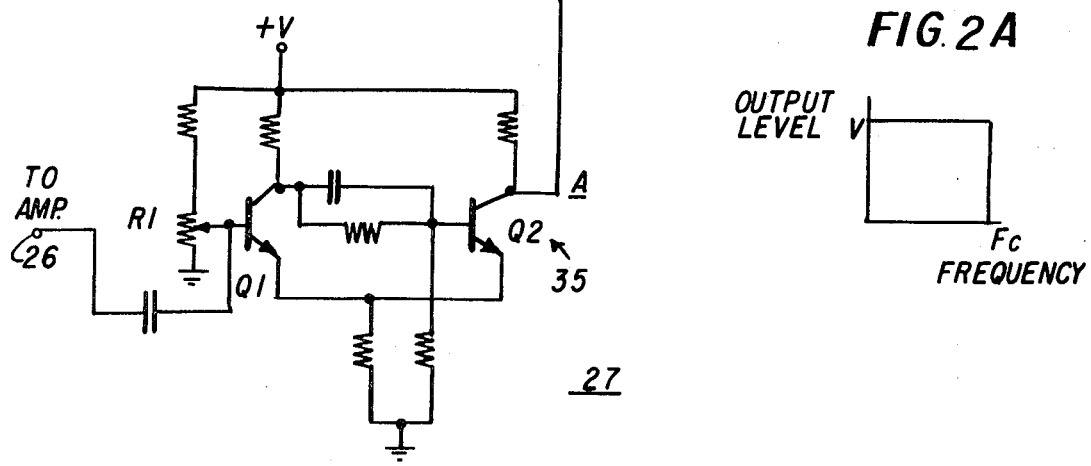
FIG. 2A shows the transfer characteristic for the digital filter circuit shown in FIG. 2.

The low pass digital filter circuit 36 is thus responsive to each signal provided at the output of the level detecting circuit 35 which is of a frequency that is less than the preselected cutoff frequency Fc of the digital filter circuit to provide a +V level output. On the other hand, responsive to signals of frequencies equal to or greater than the cutoff frequency Fc, the low pass digital filter circuit 36 provides a ground level output. Thus, the transfer characteristic of the digital filter circuit 36, shown in FIG. 2A has a substantially infinite roll off at the cutoff frequency Fc, dependent of the level of the received Doppler signal.

Examples of commercially available logic circuits suitable for application in the low pass digital filter circuit include the type SN 74123 resettable monostable circuit for the monostable circuits 40 and 46, the type SN 7486 Exclusive OR gate for exclusive OR gate 42 and the type SN 7400 and NAND gate for gates 43 and 44.

OPERATION OF THE MOTION DETECTION SYSTEM

Referring to FIG. 1, in operation, transmitter 21 generates microwave signals at a frequency of 2.45 GHz, which signals are radiated via antenna 22 into the protected area.

If a moving body 30 is present in the effective field of the system, the 2.45 GHz signals provided by transmitter 21 when reflected off the moving body 30 will be shifted in frequency, providing a Doppler signal the amplitude and frequency of which are related to characteristics of the moving body 30. It will be appreciated that the amplitude of the Doppler signal obtained is a function of the strength of the reflected signal picked up by the receiver 23 and is thus a function of the range, size and reflection characteristics of the target. The frequency of the Doppler signal, on the other hand, is related to the velocity at which the target or body 30 is moving. If the moving body 30 is a human target, the frequency of the Doppler signals reflected back to the receiver antenna 24 may range from 0 to 167 Hz for the present system.

The signals at the output of the receiver 23 which include the transmitted frequency Fo and the sum and difference of the transmitted frequency Fo and the Doppler signals (Fo ± F) are mixed with the transmitted frequency signals in the mixer circuit 25 and accordingly, the output of the mixer circuit 25 will be the Doppler frequencies. The received Doppler signals are passed over amplifier 26 to the signal detecting and filter circuit 27.

Figure 3:
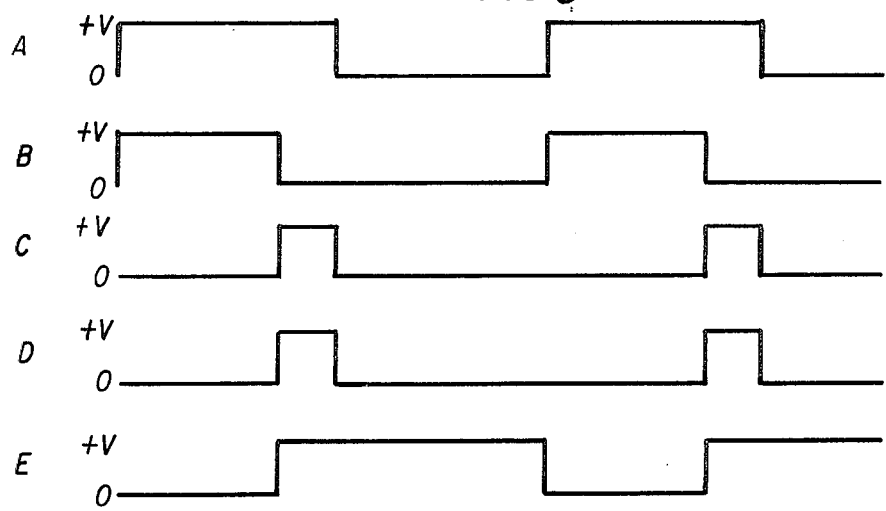
FIGS. 3 and 4 are timing diagrams showing the relationships between signals for the digital filter circuit shown in FIG. 2.

Referring to FIG. 2 and to the timing diagram given in FIG. 3, whenever a Doppler signal having a frequency less than the cutoff frequency Fc for the digital filter circuit 36 and an amplitude in excess of the threshold setting for the Schmitt trigger circuit 35 is received at the input of the Schmitt trigger circuit, the Schmitt trigger circuit 35 is enabled to provide an output of a duration which is proportional to the frequency of the received signal. The output of the Schmitt trigger circuit 35, shown on line A of FIG. 3, is extended to the set input of the monostable circuit 40. When monostable circuit 40 is enabled, the monostable circuit provides an output, shown on line B of FIG. 3, for a predetermined duration as determined by the setting of the delay circuit 41. The output of the monostable circuit 40 and the output of the Schmitt trigger circuit 35 are extended to the inputs of the exclusive OR circuit 42.

When the outputs of the monostable circuit 40 and of the Schmitt trigger 35 are +V logic levels, the exclusive OR circuit 42 remains disabled. Since in the present example the frequency of the received Doppler signal is within the pass band of the digital filter circuit 36, the duration of the input signal provided by the Schmitt trigger circuit 35 is greater than the duration of the signal output of the monostable 40 as can be seen by comparing lines A and B of FIG. 3. Thus, the exclusive OR circuit 42 will be enabled when the monostable output goes to zero or ground. At such time, the exclusive OR circuit 42 will provide a +V logic level output as shown on line C of FIG. 3, which altogether with the +V logic level provided to NAND gate 43 by the Schmitt trigger circuit will enable NAND gate 43 to provide a ground level output. Accordingly, responsive to the ground level output of NAND gate 43 NAND gate 44 will provide a +V level output, shown on line D of FIG. 3 to enable monostable circuit 46. When enabled, the monostable circuit 46 will provide a +V level output shown on line E of FIG. 3 for a duration determined by the setting of the delay circuit 48.

Figure 4:
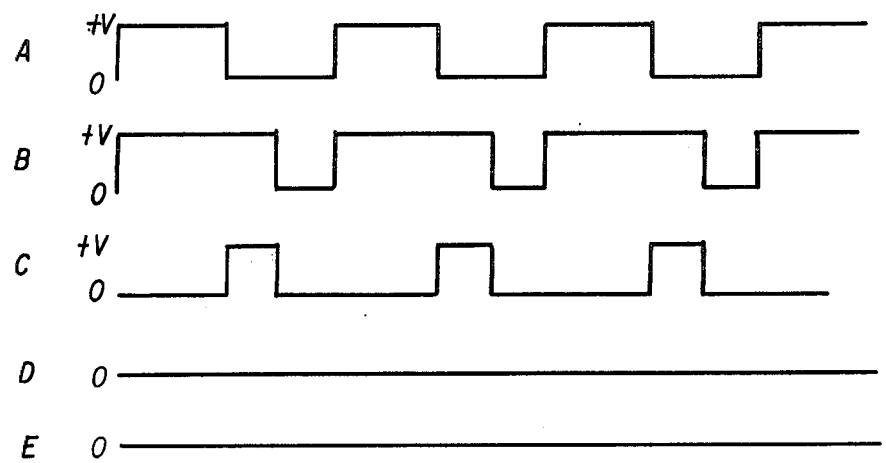

Alternatively, referring to the timing diagram of FIG. 4 in conjunction with FIG. 2, whenever the received Doppler signal extended to the input of the Schmitt trigger circuit 35 is of a level sufficient to enable the Schmitt trigger circuit but is of a frequency which is outside of the passband of the low pass digital filter circuit 36, the output of the digital filter circuit 36 will be at ground level.

Thus, for example, assuming the output of the Schmitt trigger circuit 35 is a square wave signal of +V level and of the duration shown on line A of FIG. 4, the output of the Schmitt trigger circuit 35 will enable the monostable circuit 40 to provide the output as shown in line B of FIG. 4. However, as can be seen by comparing the wave forms of lines A and B of FIG. 4, the received Doppler signal, which is of a frequency greater than the cut-out frequency Fo, will disable the Schmitt trigger circuit 35 and the input signal at A will go to ground level before the monostable circuit 40 has timed out. At such time, the exclusive OR circuit 42 will be enabled to provide the output shown in line C of FIG. 4. However, one input of NAND gate 43, which is connected to the output of the Schmitt trigger circuit, will be at ground level, and accordingly, the output provided by the exclusive OR circuit 42 will be ineffective to enable NAND gate 43. Accordingly, the monostable circuit 46 will be enabled and the output of the monostable circuit 46 will remain at ground level as indicated in line E of FIG. 4.

Second Embodiment of Signal Discriminating Circuits

Figure 5:
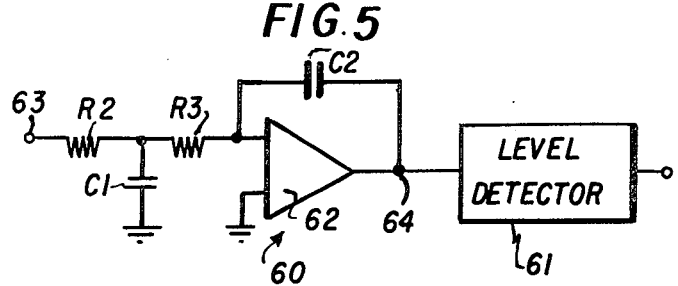
FIG. 5 is a schematic representation of a second embodiment for the signal detecting and filter circuit for the system shown in FIG. 1 including an active low pass filter circuit and a level detector circuit.
Figure 5A:
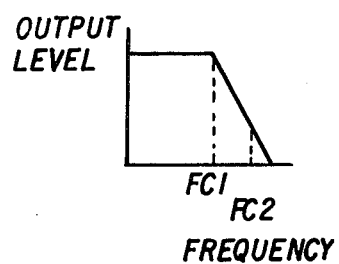
FIG. 5A shows the transfer characteristic for the active low pass filter circuit shown in FIG. 5.

While the operation of the motion detection system 20 provided by the present invention has been described with reference to a preferred embodiment wherein the signal detecting and filter circuit 27 includes a digital low pass filter circuit 35, it is apparent that other types of low pass filter circuits may be employed without departing from the scope of the invention. For example, with reference to FIG. 5, there is shown a further embodiment for the signal detecting and filter circuit 27 which includes an active low pass filter circuit 60 and a level detecting circuit 61 connected to the output of the active filter circuit 60. The low pass filter circuit 60 is comprised of an operational amplifier 62 and associated bias elements R3, R2 and C1, C2, the values of which are selected to provide the desired band pass characteristic for the low pass filter circuit 60. Since the active low pass filter circuit 60 has a finite roll-off, as shown by the transfer characteristic for the filter circuit 60 given in FIG. 5a, the band width of the active filter circuit is dependent upon the amplitudes of the signals supplied to the filter circuit 60. Thus, a lower cutoff frequency, such as 1 Hz, is selected for the filter circuit 60 to provide an overall system band width that is similar to the band width of the digital filter circuit 36 shown in FIG. 2. An increased rolloff ratio can be obtained through the use of additional stages for the low pass active filter circuit 60.

The input of the low pass active filter 60 at 63 is connected to the output of the amplifier 26 shown in FIG. 1 to receive the Doppler frequency signals provided at the output of the mixer 25. The output of the low pass active filter 60 at 64 is connected to the input of the level detecting circuit 61 which, for example, may be a Schmitt trigger circuit which is similar to the circuit 35 shown in FIG. 2.

The low pass active filter circuit 60 is operable to pass only received Doppler signals which are of a frequency within the passband of the active filter circuit 60. The signals output from the active filter 60 are extended to the level detecting circuit 61 which provides an output only when the Doppler signals passed by the filter circuit 60 are in excess of a preselected amplitude. The output of the level detector circuit 61 is extended to the alarm circuit 28 (FIG. 1) which is thus enabled to provide an alarm whenever a Doppler received signal is of a frequency within the pass band of the low pass filter circuit 60 and of an amplitude exceeding the threshold setting of the detector circuit 61.

Other Digital Filter Embodiments

With certain modifications in the connections of the digital filter 36 provided by the present invention the digital filter circuit can provide a high pass characteristic.

Figure 6:
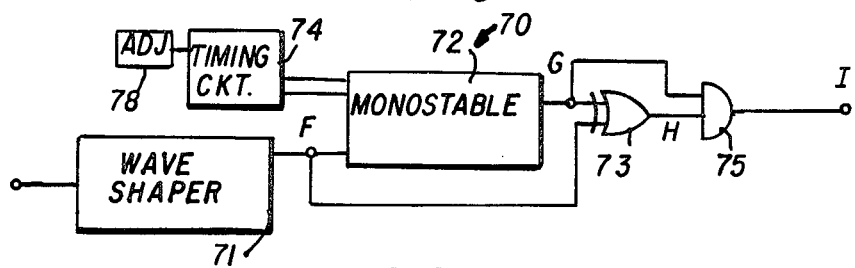
FIG. 6 is a schematic block diagram of a high pass digital filter circuit provided by the present invention.

Referring to FIG. 6, there is shown a schematic block diagram of a digital high pass filter circuit 70 and an associatd wave shaping circuit 71. The wave shaping circuit 71 is responsive to frequency signals supplied to the input of the wave shaping circuit 71 to provide logic level pulses at output F which are related in duration to the frequency of the signals input to the wave shaping circuit 71.

The high pass digital filter circuit 70 includes a monostable circuit 72 having an input connected to the output F of the wave shaping circuit 71 and an output G connected to an input of an exclusive OR gate 73. A second input of the exclusive OR gate 73 is connected to the output F of the wave shaping circuit 71.

The monostable circuit 72 is set by each signal provided at the output F of the wave shaping circuit 71 and remains enabled to provide an output at G for a duration which is determined by a timing circuit 74 associated with the monostable circuit 71. As will become apparent, the setting of the timing circuit 74 determines the cutoff frequency for the high pass filter circuit 70 and is adjustable by way of an adjust network 78. The output H of the exclusive OR gate 73 is connected to an input of an AND gate 75. The OR gate 73 has a second input connected to the output F of the wave shaping circuit 71. The AND gate 75 provides an output at I whenever signals input to wave shaping circuit 71 are within the pass band of the filter circuit 70. The AND gate 75 may comprise a pair of NAND gates connected in tandem in manner of NAND gates 43 and 44 shown in FIG. 2.

Figure 7:
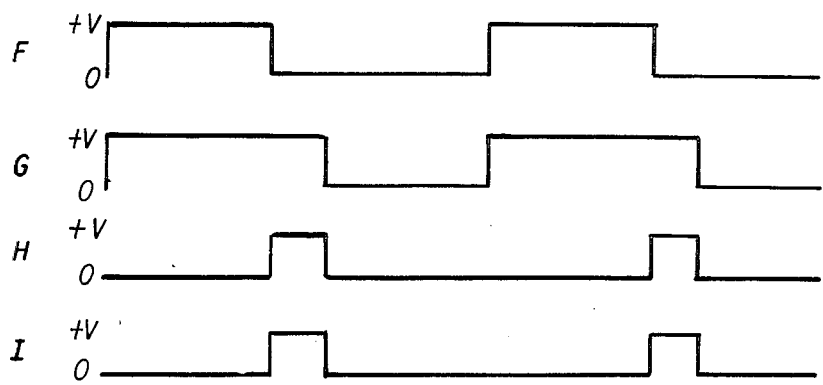
FIGS. 7 and 8 are timing diagrams showing the relationships between signals for the digital filter circuit shown in FIG. 6.

In operation, an input signal having a frequency greater than the cutoff frequency of the high pass filter circuit 70 will enable monostable circuit 72 to provide an output G, which output is of a duration determined by the timing circuit 74 associated with monostable circuit 72. If the duration of the input signal (line F, FIG. 7) is less than the duration of the monostable output (line G, FIG. 7), the exclusive OR circuit 74 will be enabled when the input signal goes to ground level, providing the +V level output shown on line H of FIG. 7. Since +V level outputs are provided at points G and H, the AND gate 75 will be enabled to provide the +V level output, shown on line I of FIG. 7, which is related to the frequency of the input signal supplied to the wave shaping circuit 71. Since the monostable 72 is operable for a known period of time, the duration of the output signal will be proportional or related to the frequency of the received signal.

Figure 8:
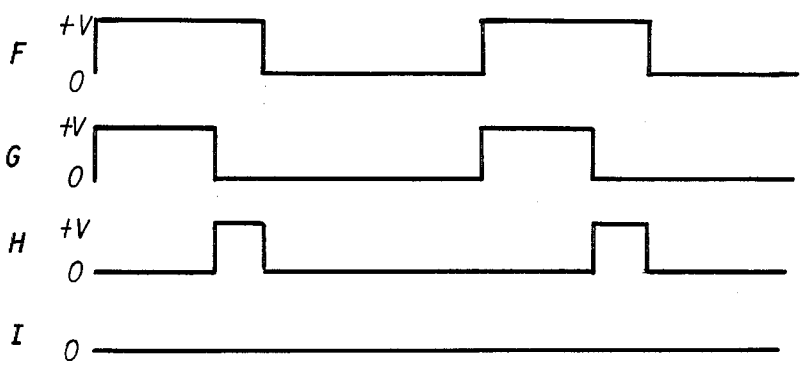

Alternatively, if the frequency of the input signal is equal to or less than the cutoff frequency of the high pass digital filter, the signal output of the wave shaping circuit 71, shown on line F of FIG. 8, will be of a greater duration than the output of the monostable, shown on line G of FIG. 8. Accordingly, when the monostable times out, the exclusive OR gate 73 will be enabled by the output F of the wave-shaping circuit 71, but NOR gate 75 will not be enabled since the input connected to the output of the monostable is at ground level.

Figure 9:
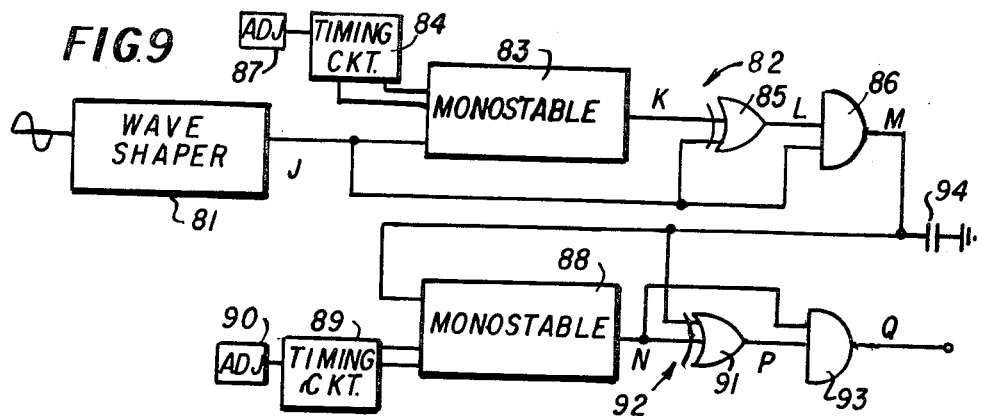
FIG. 9 is a schematic block diagram of a digital bandpass filter circuit provided by the present invention.

Referring to FIG. 9, there is shown a schematic block diagram of a digital bandpass filter cicuit 80 and an associated wave shaping circuit 81. The digital bandpass filter circuit 80 includes a low pass section 82, including a monostable circuit 83, a timing circuit 84 and adjust network 87 associated with the monostable circuit 83 for determining the cutoff frequency for the low pass section 82, an exclusive OR gate 85 and an AND gate 86, and a high pass section 92 connected in tandem with the low pass section 82, including a monostable circuit 88, a timing circuit 89 and adjust network 90 associated with the monostable circuit 88 for determining the cutoff frequency for the high pass section 87, an exclusive OR gate 91 and an AND gate 93. A transient suppressing capacitor 94 is connected to ground at the output of AND gate 86.

The upper cutoff frequency for the bandpass filter 80 is determined by the cutoff frequency for the low pass section 82 and the lower cutoff frequency for the bandpass filter 80 is determined by the high pass section 92. Thus, the cutoff frequency for the low pass section 82 is higher than the cutoff frequency for the high pass section 92. The bandpass filter circuit 80 will pass only signals of frequencies that are less than the cutoff frequency of the low pass section 82 and greater than the cutoff frequency of the high pass section 87.

Figure 10:
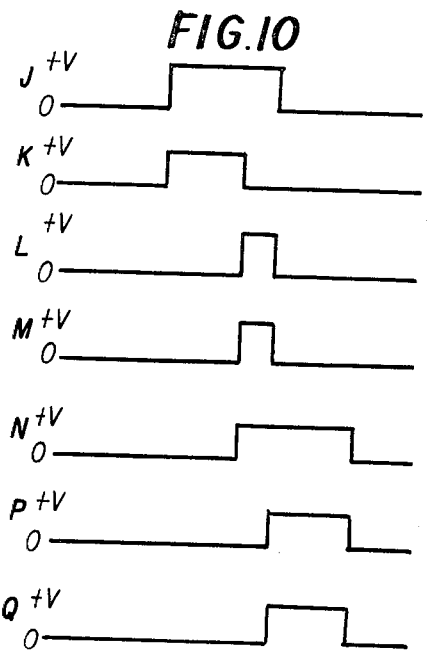
FIGS. 10–12 are timing diagrams showing the relationships between signals for the digital filter circuit shown in FIG. 9.

In operation, when a signal of a frequency that lies within the pass band of the digital bandpass filter circuit 80 is supplied to the wave-shaping circuit 81, the wave-shaping circuit 81 provides an output, shown in line J of FIG. 10, of a duration which is proportional to the frequency of the received signal. The output of the wave-shaping circuit 81 enables the monostable 83 of the low pass filter section 82 to provide an output shown in line K of FIG. 10, the duration of which is dependent upon the setting of the timing circuit 84 associated with monostable circuit 83. Since the received signal, shown on line J of FIG. 10, is lower in frequency than the cutoff frequency for the low pass section as can be seen by comparing the durations of the waveforms shown on lines J and K of FIG. 10, the monostable circuit 83 will time out before the output of the wave-shaping circuit 81 goes to ground. At such time exclusive OR gate 85 will be enabled by the output of the wave-shaping circuit 81 to provide the output shown on line L of FIG. 10. In addition, AND gate 86 will be enabled by the output of the exclusive OR gate 85 and the output of the wave-shaping circuit 81 to provide the output shown on line M of FIG. 10. The output of the AND gate 86 is connected to the set input of the monostable 88 of the high pass section 92. Accordingly, whenever an output is provided by AND gate 86, the monostable 88 of the high pass section 92 will be enabled to provide the output shown on line N of FIG. 10. The duration of the output provided by monostable 88 is determined by the setting of the associated timing circuit 89. When the output provided by the AND gate 86 of the low pass section 82 returns to a ground level, exclusive OR gate 91 of the high pass section 92 will be enabled to provide the output shown in line P of FIG. 10. In addition, AND gate 93 of the high pass circuit section 92 will also be enabled to provide the output shown on line Q of FIG. 10.

Figure 11:
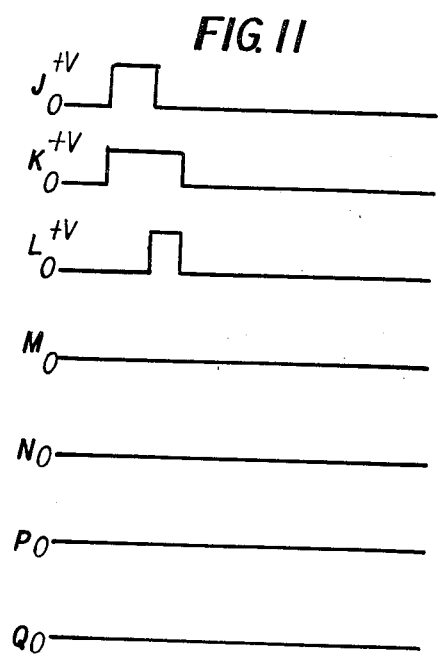

Alternatively, assuming the frequency of the signal received by the wave-shaping circuit 81 is greater than the high frequency cutoff for the bandpass filter 80, the monostable 83 of the low pass section 82 will be enabled by the output signal shown on line J of FIG. 11, provided by the wave-shaping circuit 81 to provide the output shown on line K of FIG. 11. Since the received signal is greater in frequency than the cutoff frequency of the bandpass filter 80, the duration of the signal provided by the wave-shaping circuit 81 is less than the duration of the output provided by the monostable circuit 83. Accordingly, when the input signal J returns to ground level, the monostable circuit 83 remains enabled. Therefore, when the exclusive OR gate 85 is enabled by the output provided by the monostable circuit 83, the AND gate 86 of the low pass section 82 will not be enabled, and moreover, the high pass section 92 of the bandpass filter circuit 80 will not be enabled. Consequently, the output of the bandpass filter circuit 80 will remain at ground level.

Figure 12:
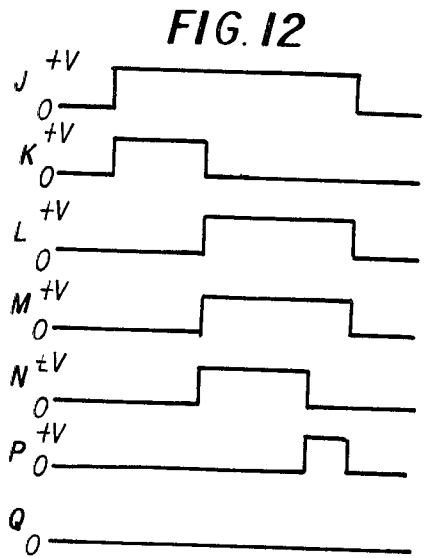

In the event that the frequency of the signal received by the wave-shaping circuit 81 is less than the lower cutoff frequency of the bandpass filter circuit 80, the monostable circuit 83 will be enabled by the output of the wave-shaping circuit 81, shown in FIG. J of FIG. 12, to provide the output shown in line K of FIG. 12.

When the monostable 83 times out, the exclusive OR gate 85 will be enabled to provide the output shown in Line L of FIG. 12 and in addition, the AND gate 86 will be enabled by the output of exclusive OR gate 85 and the output of the wave-shaping circuit 81 to provide the output shown in line M of FIG. 12.

When the AND gate 86 of the low pass section 82 is enabled, the output of the AND gate 86 will enable the monostable circuit 88 of the high pass section 92 to provide the output shown in line N of FIG. 12. Since the frequency of the received signal is lower than the cutoff frequency for the high pass section 92, the duration of a signal supplied to the monostable 88 from the AND gate 86 will be greater than the duration of the output provided by the monostable circuit 88. Accordingly, when the monostable output goes to ground level, exclusive OR gate 91 will be enabled to provide the output shown on line P of FIG. 12. However, AND gate 93 will not be enabled since the output of the monostable 88 is at 0 level. Therefore, the bandpass filter will provide a ground level output.

We claim:

1. In an intrusion alarm detection system for detecting the presence of a human intruder moving within a protected area, means for producing Doppler signals within a predetermined frequency range whenever there is a moving body within the effective radiated energy field of the system, said Doppler signals being related in amplitude and frequency to characteristics of the moving body, and signal detecting means for detecting the amplitude and frequency of each of said Doppler signals, said signal detecting means being responsive to a single cycle of a Doppler signal having an amplitude greater than a preselected level and a frequency less than a predetermined frequency within said predetermined frequency range which is indicative of human motion to provide an output signal indicative of the detection of a human intruder moving within the protected area for each cycle of the Doppler signal having an amplitude greater than said preselected level and a frequency less than said preselected frequency.

2. A system as set forth in claim 1 wherein said signal detecting means includes level detecting means responsive to each cycle of a Doppler signal in excess of a predetermined amplitude to provide a logic level output of a duration representative of the frequency of the Doppler signal, and digital filter means responsive to each logic level output of said level detecting means that is in excess of a predetermined duration to provide a further logic level output which indicates the detection of a human intruder moving within the protected area.

3. A system as set forth in claim 1 wherein said signal detecting means includes low pass active filter means for passing only Doppler signals which are of a frequency less than a predetermined cutoff frequency for said active filter means and a level detecting circuit responsive to each cycle of the Doppler signals passed by said active filter means which are of an amplitude greater than a predetermined level for providing an output signal indicative of the detection of a human intruder moving within the protected area.

4. In an intrusion detection system for detecting the presence of a human intruder moving within a protected area, means for producing Doppler frequency signals within a predetermined frequency range whenever there is a moving body within the effective radiated energy field of the system, said Doppler signals being related in amplitude and frequency to characteristics of the moving body, and signal detecting means including means for discriminating between Doppler signals having an amplitude in excess of a given level and Doppler signals having an amplitude less than said level and means for discriminating between Doppler signals having a frequency less than a preselected frequency within said predetermined range which is indicative of human motion and Doppler signals having a frequency equal to or greater than said preselected frequency, said signal detecting means being responsive to a single cycle of a Doppler signal having a frequency that is less than said preselected frequency and having an amplitude in excess of said given level to provide an output signal indicative of the detection of a human intruder moving within the protected area for each cycle of the Doppler signal having an amplitude greater than said given level and a frequency less than said preselected frequency.

5. In an intrusion alarm detection system for detecting the presence of a human intruder moving within a protected area, a Doppler radar system for producing Doppler signals within a predetermined frequency range whenever there is a moving body within the effective radiated energy field of the system, said Doppler signals being related in amplitude and frequency to characteristics of said moving body, level detecting means responsive to each Doppler signal in excess of a given level to provide a first output signal of a duration representative of the frequency of the Doppler signal for each cycle of the Doppler signal, and digital filter means responsive to each output signal provided by said level detecting means that is of a duration greater than a predetermined duration which is indicative of human motion to provide a second output signal indicative of the detection of a human intruder moving within the protected area.

6. A system as set forth in claim 5 wherein said digital filter means includes reference means for providing a reference signal of a predetermined duration representing a cutoff frequency for said digital filter means, and output means for comparing the reference signal with each output signal provided by said level detecting circuit to provide said second output signal whenever the duration of the signal provided by said level detecting means is greater than the duration of said reference signal.

7. A system as set forth in claim 6 wherein said output means includes first means responsive to said reference signal and said first output signal to provide an enabling signal whenever the duration of said first output signal is greater than the duration of said reference signal and second means controlled by said enabling signal and said first output signal to provide said second output signal whenever the frequency of the first output signal is less than the cutoff frequency of the digital filter means.

8. A system as set forth in claim 7 wherein said reference means includes means for adjusting the cutoff frequency of said digital filter means.

9. A system as set forth in claim 6 wherein said output means includes for providing a second output of a predetermined duration for each Doppler signal detected.

10. In an intrusion alarm detection system for detecting the presence of a human intruder moving within a protected area, a Doppler radar system for producing Doppler signals within a predetermined frequency range whenever there is a moving body within the effective radiated energy field of the system, said Doppler signals being related in amplitude and frequency to characteristics of said moving body, level detecting means responsive to each Doppler signal in excess of a given level to provide a first logic level output signal of a duration representative of the frequency of the Doppler signal for each cycle of the Doppler signal and digital filter means including monostable circuit means responsive to each output signal provided by said level detecting means to provide a logic level reference signal of a predetermined duration representing a cutoff frequency for said digital filter means, and gating means for comparing the reference signal with each output signal provided by said level detecting means to provide a second logic level output signal indicative of the detection of a human intruder moving within the protected area whenever the duration of the output signal provided by said level detecting means is greater than the duration of said reference signal.

11. A system as set forth in claim 10 wherein said gating means includes exclusive OR means controlled by said reference signal and said first output signal to provide an enabling output signal whenever the duration of said first output signal is greater than the duration of said reference signal, and output gating means controlled by said enabling signal and said first output signal to provide said second logic level output.

12. A system as set forth in claim 10 wherein said monostable circuit means includes an adjustable timing network for enabling the duration of the reference signal to be varied.

13. A system as set forth in claim 11 wherein said digital filter means includes further monostable circuit means responsive to said second logic level output signal to provide an output signal of a predetermined duration.

14. A system as set forth in claim 13 wherein said further monostable circuit means includes an adjustable timing network for enabling the duration of the output signal provided by said further monostable circuit means to be varied.

* * * * *

PO-1050
(5/69)

UNITED STATES PATENT OFFICE
CERTIFICATE OF CORRECTION

Patent No. 3,803,599  Dated April 9, 1974

Inventor(s) Michael B. McLean and Allen Rasmussen

It is certified that error appears in the above-identified patent and that said Letters Patent are hereby corrected as shown below:

Column 14, line 9, after "includes" insert -- means --.

Signed and sealed this 10th day of September 1974.

(SEAL)
Attest:

McCOY M. GIBSON, JR.
Attesting Officer

C. MARSHALL DANN
Commissioner of Patents